United States Patent
Wagner

(10) Patent No.: US 9,819,442 B2
(45) Date of Patent: Nov. 14, 2017

(54) INTERNAL INTERFERENCE SIGNALING

(75) Inventor: Elmar Wagner, Taufkirchen (DE)

(73) Assignee: INTEL DEUTSCHLAND GMBH, Neubiberg (DE)

(*) Notice: Subject to any disclaimer, the term of this patent is extended or adjusted under 35 U.S.C. 154(b) by 306 days.

(21) Appl. No.: 13/421,887

(22) Filed: Mar. 16, 2012

(65) Prior Publication Data

US 2013/0242939 A1 Sep. 19, 2013

(51) Int. Cl.
| | |
|---|---|
| *H04L 1/00* | (2006.01) |
| *H04B 1/525* | (2015.01) |
| *H04W 36/20* | (2009.01) |
| *H04W 52/24* | (2009.01) |
| *H04W 72/08* | (2009.01) |
| *H04W 88/06* | (2009.01) |
| *H04W 72/04* | (2009.01) |

(52) U.S. Cl.
CPC .......... *H04L 1/0003* (2013.01); *H04B 1/525* (2013.01); *H04W 36/20* (2013.01); *H04W 52/243* (2013.01); *H04W 72/0413* (2013.01); *H04W 72/082* (2013.01); *H04W 88/06* (2013.01); *Y02B 60/31* (2013.01)

(58) Field of Classification Search
CPC . H04W 72/00–72/10; H04W 72/1215; H04W 72/12–72/14; H04W 88/06; H04W 36/0083; H04W 36/0061; H04W 84/12
USPC ............... 370/252, 331, 343; 455/501, 553.1
See application file for complete search history.

(56) References Cited

U.S. PATENT DOCUMENTS

| | | | |
|---|---|---|---|
| 7,636,407 | B2 | 12/2009 | Maeda et al. |
| 7,941,178 | B2* | 5/2011 | Guo ................... H04W 72/1215 370/335 |
| 8,861,423 | B2 | 10/2014 | Li et al. |
| 2003/0198307 | A1* | 10/2003 | Neill et al. ..................... 375/346 |
| 2006/0067446 | A1 | 3/2006 | Maeda et al. |
| 2007/0197170 | A1* | 8/2007 | Boos ....................... H04B 1/406 455/78 |

(Continued)

FOREIGN PATENT DOCUMENTS

| | | |
|---|---|---|
| CN | 1756096 A | 4/2006 |
| CN | 101534181 A | 9/2009 |

(Continued)

OTHER PUBLICATIONS

3GPP TSG-RAN WG 4 Meeting #62, Dresden, Germany R4-120442 "Way forward for inter-band CA Class A2", Feb. 6-10, 2012, pp. 1-5.

(Continued)

*Primary Examiner* — Yaotang Wang
(74) *Attorney, Agent, or Firm* — Viering, Jentschura & Partner mdB

(57) ABSTRACT

In accordance with an illustrative embodiment, a method and device are provided. The method, system, and device comprise an information module and a communication module. The information module may be configured to identify information related to a plurality of signals associated with the device and identify a signal interference affecting a first signal by a second signal of the plurality of signals based on the information. The communication module may be configured to send interference information to a network interface related to the signal interference if the signal interference is identified.

17 Claims, 9 Drawing Sheets

(56) References Cited

U.S. PATENT DOCUMENTS

| | | | |
|---|---|---|---|
| 2007/0270113 A1* | 11/2007 | Oh | H04W 72/082 455/185.1 |
| 2009/0185521 A1 | 7/2009 | Li et al. | |
| 2009/0252122 A1* | 10/2009 | Leinonen et al. | 370/332 |
| 2010/0067469 A1* | 3/2010 | Gaal | H04W 72/082 370/329 |
| 2011/0097998 A1* | 4/2011 | Ko | H04W 72/1215 455/41.2 |
| 2011/0116570 A1* | 5/2011 | Kim | H04J 11/005 375/295 |
| 2011/0312288 A1* | 12/2011 | Fu | H04B 1/406 455/88 |
| 2012/0033645 A1* | 2/2012 | Mantravadi | H04W 72/1215 370/336 |
| 2012/0207040 A1* | 8/2012 | Comsa et al. | 370/252 |
| 2013/0044621 A1* | 2/2013 | Jung et al. | 370/252 |
| 2013/0115997 A1* | 5/2013 | Immonen et al. | 455/522 |
| 2013/0137435 A1* | 5/2013 | Shi | 455/436 |
| 2013/0194938 A1* | 8/2013 | Immonen | H04B 1/525 370/252 |
| 2013/0194939 A1* | 8/2013 | Kaukovuori et al. | 370/252 |
| 2013/0196648 A1* | 8/2013 | Immonen et al. | 455/422.1 |

FOREIGN PATENT DOCUMENTS

| | | |
|---|---|---|
| CN | 101877853 A | 11/2010 |
| WO | 2012021879 A2 | 2/2012 |
| WO | WO2012019369 A1 * | 2/2012 |

OTHER PUBLICATIONS

3GPP TSG RAN WG Meeting #62, Dresden, Germany R4-120744 "MOP and REFSENS Relaxation for Carrier Aggregation for Band 4 and Band 17", Feb. 6-10, 2012, pp. 1-10.

Office Action received for the corresponding CN Patent Application No. 201310158982.2, dated Aug. 31, 2015, 8 pages of Office Action and 16 pages of English Translation.

Office Action received for CN Patent Application No. 201310158982.2, dated Apr. 15, 2016, 6 pages of Office Action and 12 pages of English translation.

Office Action received for DE Patent Application No. 102013102695.8, dated Feb. 10, 2016, 14 pages of Office Action (information purpose only).

Chinese Office Action based on Application No. 201310158982.2 dated Mar. 24, 2017 5 Pages and 8 Pages of English Translation (For Reference Purpose Only).

* cited by examiner

INTERNAL INTERFERENCE SIGNALING

FIELD

Embodiments relate generally to systems and methods for managing internal interference signaling with user equipment.

BACKGROUND

In mobile communications, to achieve higher data rates it is necessary to increase the transmission bandwidths over those that can be supported by a single carrier or channel. One way to increase the transmission bandwidth is through carrier aggregation (CA), or sometimes channel aggregation. By using carrier aggregation, it is possible to utilize more than one carrier and in this way increase the overall transmission bandwidth.

Carrier aggregation allows expansion of effective bandwidth delivered to a user terminal through concurrent utilization of radio resources across multiple carriers. Multiple component carriers are aggregated to form a larger overall transmission bandwidth. These channels or carriers may be in contiguous elements of the spectrum, or they may be in different bands.

Depending on the operational mode it can happen, that a mobile device including a radio transceiver can generate interference that interferes with its own receiver operation. One example is LTE carrier aggregation between bands 17 and 4, where at the same time the transmitter can be activated on band 17, while one of the receivers needs to receive in band 4. Unfortunately all transmitters generate the third harmonic. However, the third harmonic of band 17 TX is on the same frequency as the receiver of band 4 resulting in a degraded sensitivity or signal quality.

Current solutions to signal interference are increasing the filtering requirements, reducing the output power of the interferer, or optimizing the cross-coupling to minimize the interference. In using filtering, the filters will increase insertion losses at the transceiver output resulting in significantly higher current consumption. Additionally, this high isolation cannot be achieved on a printed circuit board, therefore cross-coupling will bypass all these filters.

BRIEF SUMMARY

In accordance with an illustrative embodiment, a method is provided for managing signal interference. The method comprising identifying information related to a plurality of signals associated with the a device; identifying the signal interference affecting a first signal by a second signal of the plurality of signals based on the information; and sending interference information related to the signal interference to a network interface if the signal interference is identified.

In accordance with an illustrative embodiment, a device is provided. The device comprising a processing unit, an information module, and a communication module. The information module may be configured to identify information related to a plurality of signals associated with the device and identify a signal interference affecting a first signal by a second signal of the plurality of signals based on the information. The communication module may be configured to send interference information to a network interface related to the signal interference if the signal interference is identified.

In accordance with an illustrative embodiment, a system for managing signal interference is provided. The system comprises a device and a network interface. The device may be for identifying information related to a plurality of signals associated with the device and identify the signal interference affecting a first signal by a second signal of the plurality of signals based on the information. The network interface may be for performing a corrective action to reduce the signal interference.

In accordance with an illustrative embodiment, a method is provided for managing signal interference. The method comprises receiving interference information related to the signal interference from a device. The method also identifies a corrective action using the interference information. Also, the method performs the corrective action.

In accordance with an illustrative embodiment, a network is provided. The network comprises a network interface configured to receive interference information related to signal interference from a device, identify a corrective action using the interference information, and perform the corrective action.

BRIEF DESCRIPTION

Embodiments will be explained in more detail in the following text, and are illustrated in the figures, in which.

DETAILED DESCRIPTION

The following detailed description refers to the accompanying drawings that show, by way of illustration, specific details and embodiments in which the invention may be practiced. The word "exemplary" is used herein to mean "serving as an example, instance, or illustration". Any embodiment or design described herein as "exemplary" is not necessarily to be construed as preferred or advantageous over other embodiments or designs.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Although the invention is illustrated and described herein with reference to certain preferred embodiments, the invention is not intended to be limited to the details shown.

Modifications may be made in the details within the scope and range equivalents of the claims and without departing from the invention.

The illustrative embodiments provide that the occurrence of interference in user equipment is signaled to a base station. The base station can take action to avoid the interference. The interference may happen when one or more contributors exist, such as: the receiver needs to operate at the sensitivity limit; the transmitter needs to operate at a high output power generating large harmonics; the frequencies of the cells assigned to the mobile need to be chosen so that the harmonic is inside the receiver passband; in case of Long Term Evolution (LTE), the resource blocks in the receiver (RX) and transmitter (TX) need to be chosen such that the harmonics condition is fulfilled. Therefore if this interference occurs, it can be signaled to the base station and the base station can either initiate a handover to another cell, where there is no harmonics condition, it can switch off carrier aggregation, it can use different resource blocks, TX power could be reduced, or some other suitable correction action may be taken.

Figure 1:
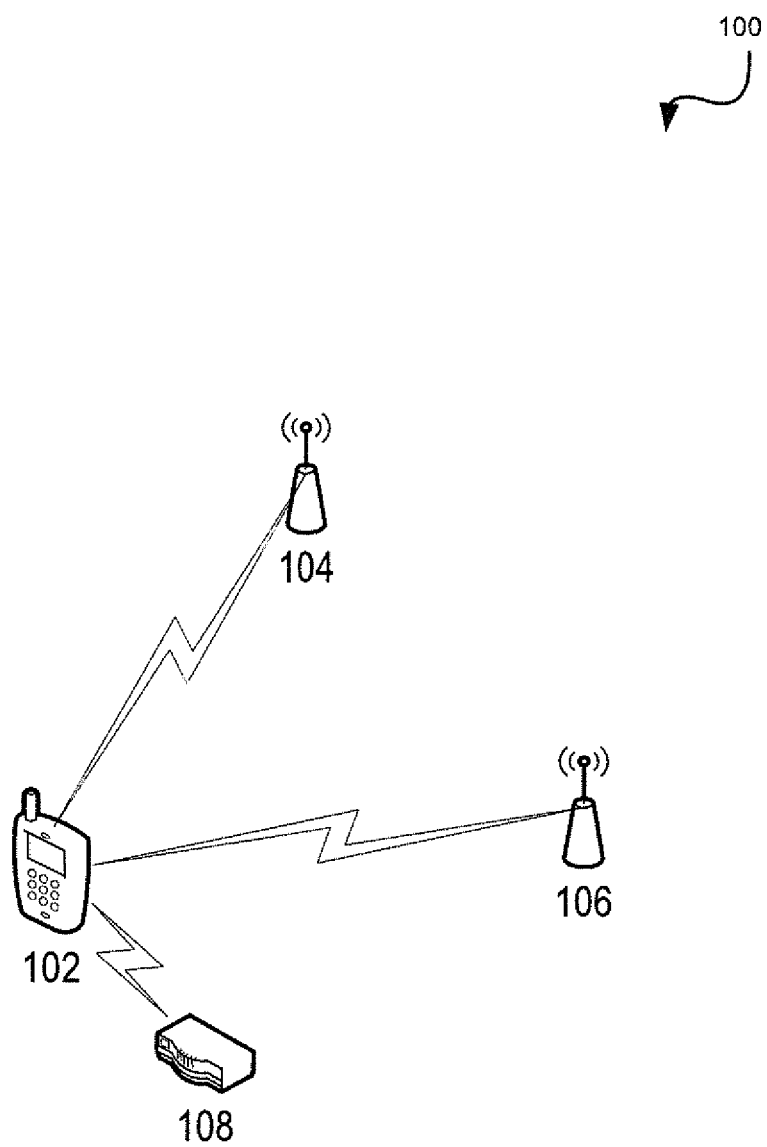
FIG. 1 shows a communication system in accordance with an illustrative embodiment.

FIG. 1 shows a communication system in accordance with an illustrative embodiment.

In an embodiment, communication system 100 may include suitable interfaces for receiving, transmitting, and/or otherwise communicating data or information in a network environment. Such network interfaces may be inclusive of multiple wireless technologies, for example, WiFi, WiMax, 3G, 4G, white space, 802.11x, satellite, Bluetooth, near field communication, LTE, GSM/WCDMA/HSPA, CDMA1x/ EVDO, DSRC, CAN, GPS, etc.

Communication system 100 may include user equipment 102, base stations 104 and 106, and wireless access point 108. In other embodiments, communication system 100 may include more or less base stations and user equipment devices.

User equipment 102 may be referred to as a communication terminal or mobile device. User equipment 102 may include network interfaces for receiving, transmitting, and/or otherwise communicating data or information. User equipment 102 can be a hand-held mobile phone, a laptop computer equipped with a mobile broadband adapter, or any other device capable of communicating with base stations 104 and 106.

Even though it appears in FIG. 1 that user equipment 102 is connected with all of base stations 104, 106 and wireless access point 108, it is understood that user equipment 102 may be connected with only one or two of the network interfaces at any time.

Figure 2:
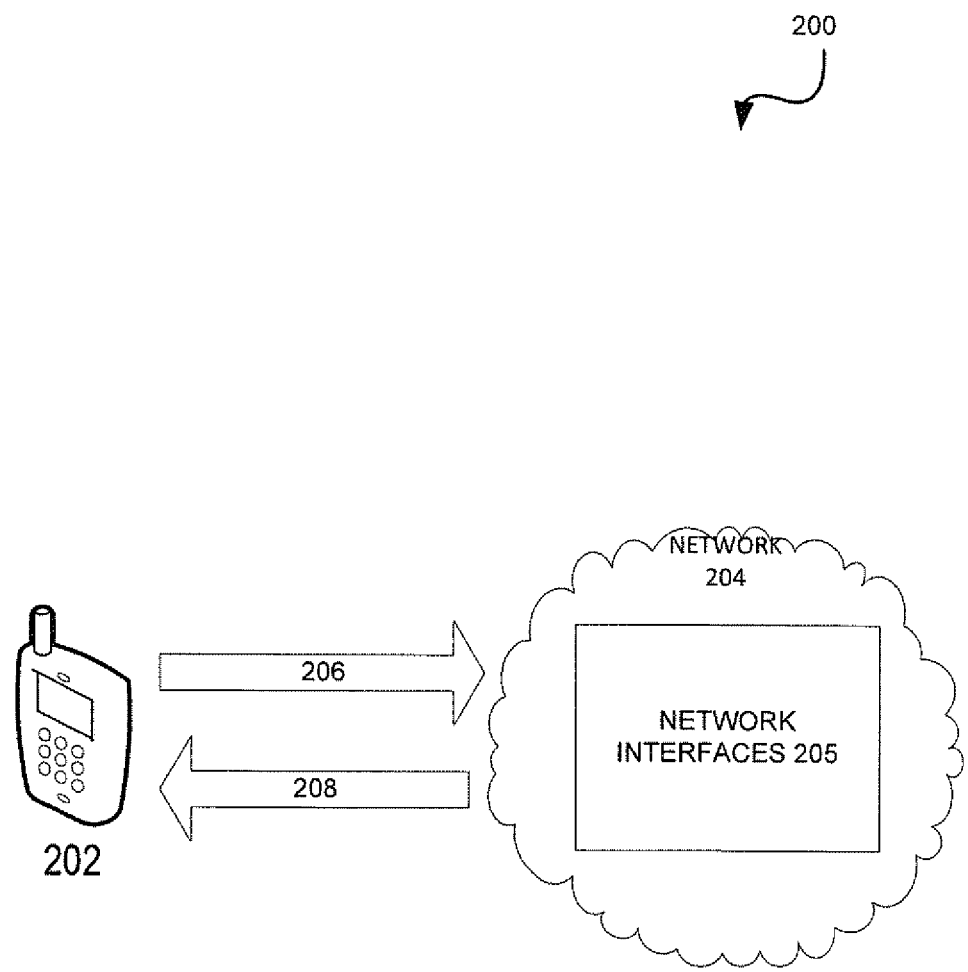
FIG. 2 shows a communication system in accordance with an illustrative embodiment.

FIG. 2 shows a communication system in accordance with an illustrative embodiment. Communication system 200 may be one example of communication system 100 as shown in FIG. 1.

In an embodiment, communication system 200 may include network 204 with network interfaces 205 for receiving, transmitting, and/or otherwise communicating data or information in a network environment. Communication system 200 may also include device 202.

Device 202 may be a network interface capable of receiving, transmitting, and/or otherwise communicating data or information with network interfaces 205. In an embodiment, device 202 may be any mobile or non-mobile device with at least two or more antennas. Device 202 may be, for example, user equipment. An example of user equipment may be a smart phone, mobile phone, laptop, tablet personal computer, surveillance camera, or other type of suitable device.

In an embodiment, network 204 may be a cellular network, wireless local area network, another type of wireless network, or a combination thereof. Network 204 may include network interfaces 205. Network interfaces 205 are capable of receiving, transmitting, and/or otherwise communicating data or information with device 202. Network interfaces 205 may include a plurality of base stations and wireless access points. In an embodiment, network interfaces 205 may also include other devices.

Additionally, communication system 200 also may include first message 206 and second message 208. Messages 206, 208 may include information.

First message 206 may be sent from device 202 to network interfaces 205. In an embodiment, first message 206 may be sent to a base station within network interfaces 205. First message may include interference information related to a plurality of signals associated with device 202. The information may include, in any combination, frequency information, TX/RX mode, frequency bands, whether carrier aggregation is used, session info, occurrence of signal interference, level of signal interference, type of signal interference, power level of each signal, value indicating a minimum frequency shift that is required to reduce the signal interference, corrective action, and other types of info related to each signal in the plurality of signals.

Second message 208 may be sent from network interfaces 205 to device 202. In an embodiment, second message 208 may be sent from a base station in network interfaces 205. Second message may include information related to a corrective action. The information may include, in any combination, the corrective action utilized by network 204 and any changes device 202 may be required to make, such as changing the power level of a signal.

During operation of communication system 200, messages 206, 208 may be sent and received a number of times.

Figure 3:
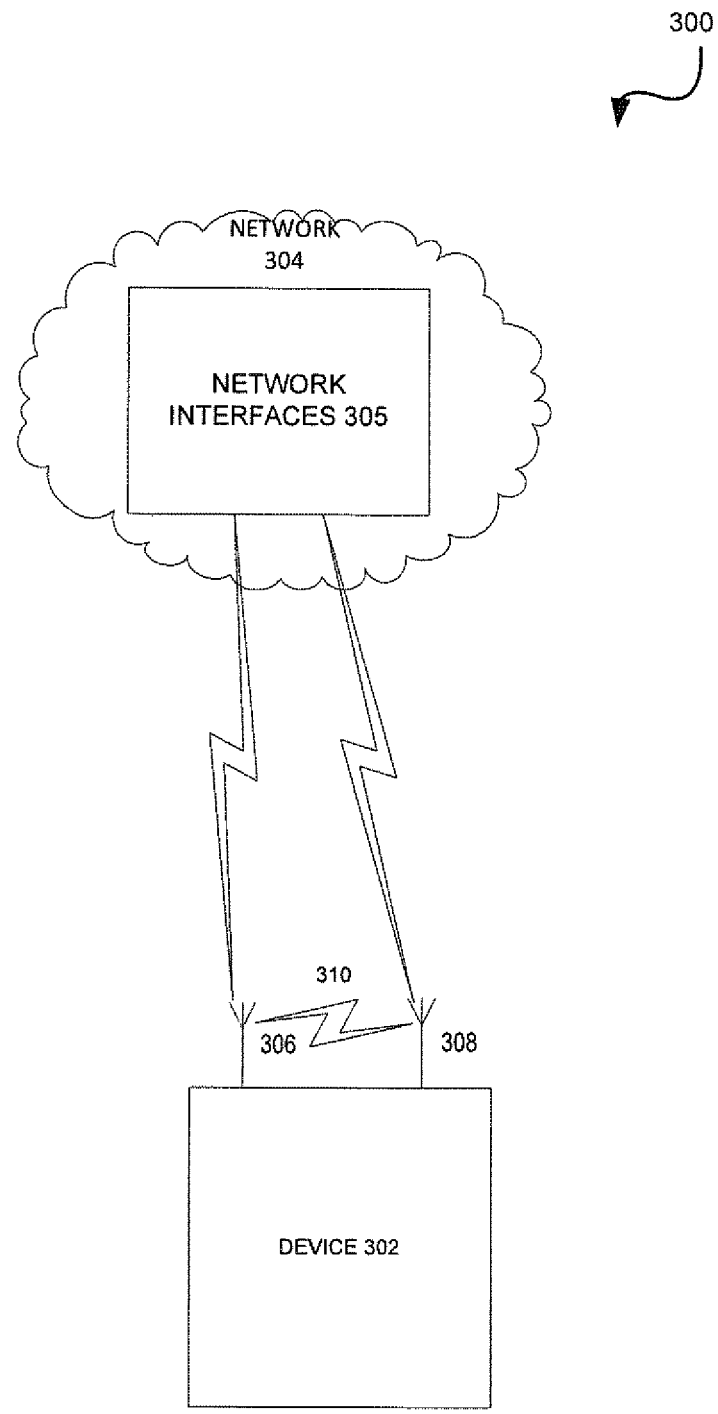
FIG. 3 shows a communication system in accordance with an illustrative embodiment.

FIG. 3 shows a communication system in accordance with an illustrative embodiment. Communication system 300 may be one example of communication system 100 as shown in FIG. 1.

In an embodiment, communication system 300 may include network 304 with network interfaces 305 for receiving, transmitting, and/or otherwise communicating data or information in a network environment. Communication system 300 may also include device 302.

Device 302 may be an example of device 202 as shown in FIG. 2. Device 302 may include first antenna 306 and second antenna 308. Additionally, device 302 may include other antennas.

In an embodiment, antennas 306, 308 may be used to send and receive signals with network interfaces 305. The signal sent from device 302 to network interfaces 305 may be referred to as the uplink. Conversely, the signal sent from network interfaces 305 to device 302 may be referred to as the downlink.

Furthermore, antennas 306, 308 may operate on different frequency bands. A frequency band is a range of frequencies. In some instances, network technologies operate on a defined number of bands. For example, Long Term Evolution (LTE) is implemented on over forty bands. In one example, band 17 used in the uplink may operate in the frequencies of 704-716 MHz. In another example, band 4 used in the downlink operates in the frequencies of 2110-2155 MHz.

In some instances, as a result of antennas 306, 308 operating on different frequency bands, signal interference 310 may occur. Signal interference 310 may be the interference of a signal associated with one antenna, e.g. antenna 306, interfering with a signal of another antenna, e.g. antenna 308. In another embodiment, signal interference 310 may be interference of a signal associated with one antenna interferes with another signal associated with the same antenna. In yet another embodiment, a signal produced from another component of device 302 may interfere with a signal of antenna 306 or 308. For example, the internal clock harmonics of device 302 may interfere with a signal being received at antenna 306.

Signal interference may affect the quality of the signal and therefore the data being transmitted on signals being received or transmitted by device 302. The degradation of data may be undesirable.

In an example, antenna 306 may be operating on band 4 of LTE in the downlink while antenna 308 may be operating on band 17 of LTE in both the downlink and uplink. In another embodiment, bands 4 and 17 may both operate on the same antenna. The downlink of band 17 operates in the frequency range of 704-716 MHz. However, the third harmonic of this frequency range is 2112-2148 MHz. The third harmonic overlaps with the downlink of band 4 (frequency range of 2110-2155 MHz) at antenna 306. This type of signal interference may be referred to as harmonic interference.

In an embodiment of this disclosure, when referencing signal interference, it is understood that the signal interference may be from a harmonic of a signal. In other embodiments, signal interference may be from the fundamental frequency. Additionally, the sources of the signal interference may be from signals sent over the same or different technologies, for example, cellular networks and/or wireless local area networks. The signal interference may result from the overlapping of frequency bands and/or adjacent frequency bands in the different signals.

The harmonic of a wave is a component frequency of the signal that is an integer multiple of the fundamental frequency. In other words, if the fundamental frequency is f, the harmonics have frequencies 2f, 3f, 4f, etc. For example, if the fundamental frequency is 50 Hz, then the third harmonic is 150 Hz.

Figure 4:
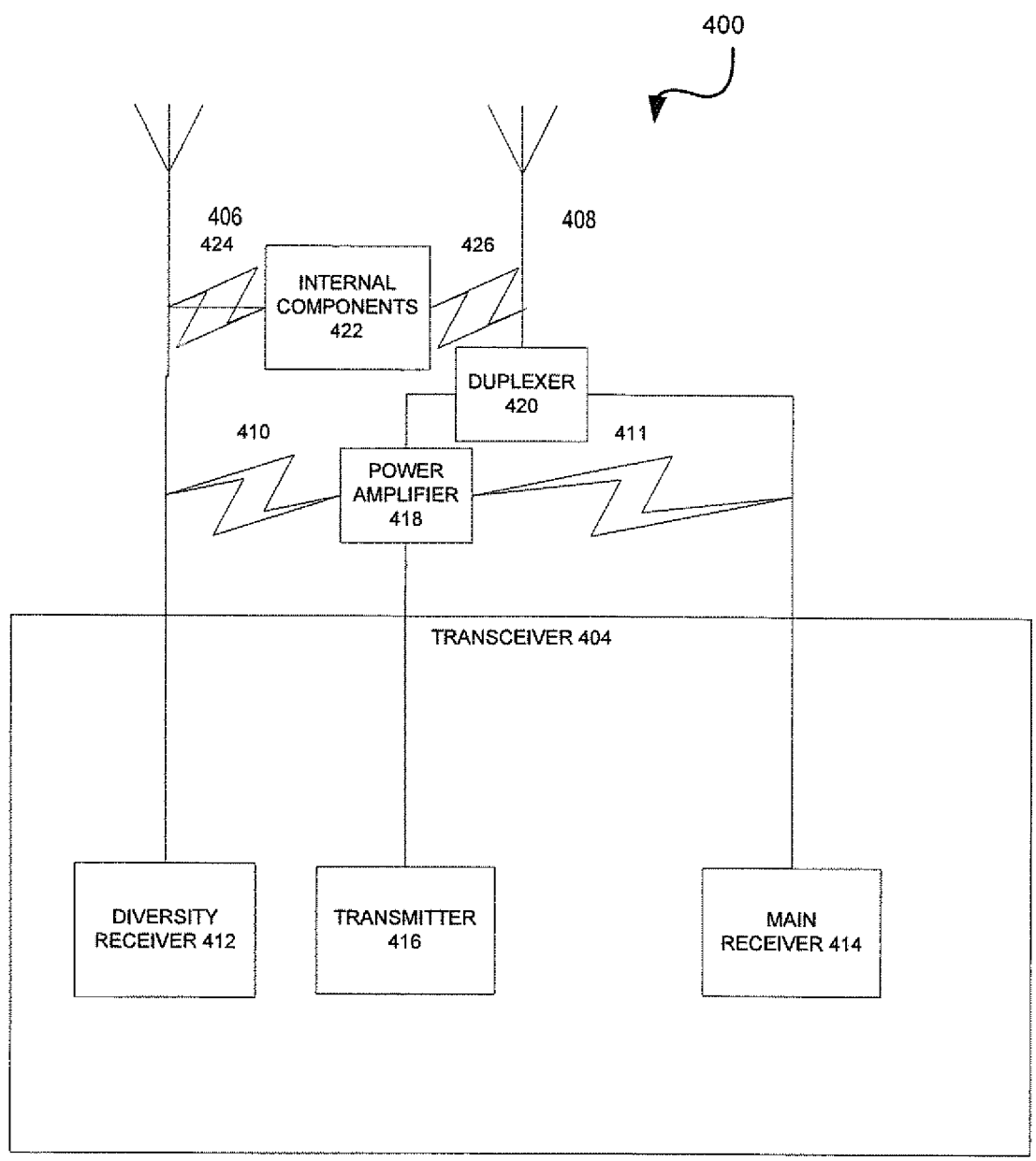
FIG. 4 shows a device in accordance with an illustrative embodiment.

FIG. 4 shows a device in accordance with an illustrative embodiment. Device 402 may be one example of device 102 as shown in FIG. 1.

In an embodiment, device 402 may include transceiver 404, antenna 406, antenna 408, signal interference 410, signal interference 411, diversity receiver 412, main receiver 414, transmitter 416, and power amplifier 418. Additionally, device 402 may include other antennas, such as, for example, a WiFi antenna or Bluetooth antenna.

In an embodiment, device 402 may be operating under carrier aggregation and antenna diversity. In other embodiment, device 402 may operate using only antenna diversity, carrier aggregation, or neither. Antenna diversity uses two or more antennas to the quality and reliability of a wireless link. Carrier aggregation allows expansion of effective bandwidth delivered to device 402 through concurrent utilization of radio resources across multiple carriers. Multiple component carriers are aggregated to form a larger overall transmission bandwidth. For example, instead of operating in just one frequency band, device 402 may operate within two frequency bands. More specifically, as an example, device 402 may receive and transmit on LTE band 17 and receive on LTE band 4, as shown in FIG. 3.

In an embodiment, device 402 may be utilizing antenna diversity. In device 402, transceiver 404 includes diversity receiver 412 that may be connected to antenna 406 and configured to receive signals in two frequency bands. In addition, transmitter 416 may be connected to antenna 408 and configured to send signals in two frequency bands. The signals from transmitter 416 may be amplified through power amplifier 418.

The harmonics of a signal may be generated inside power amplifier 418. The harmonics may be signal interferences 410, 411. Power amplifier 418 may also be coupled to main receiver 414 through duplexer 420. Since power amplifier 418 is coupled to main receiver 414, harmonics from power amplifier 418 may be present in main receiver 414. One of these harmonics could be, for example, the third harmonic of a signal associated with power amplifier 418. The level of the harmonics at transistors of power amplifier 418 may be high. For example, the level may be as high as +10 dBm.

In current solutions to reduce harmonics, a matching is integrated together with an additional lowpass filter. However, the different embodiments of this disclosure recognize that there are still several possibilities how the harmonics generated in transistors of power amplifier 418 can leak outside. Four of these possibilities are:

A. Coupling of the signal lines radiating the harmonics.

B. Control lines of a module of power amplifier 418 (enable lines, biasing, interface etc.) can radiate the harmonics on the PCB.

C. Supply lines of a core of power amplifier 418 are usually blocked, but a reduced level of the harmonics will still leak out here.

D. Ground connections of power amplifier 418 will have a significant current on the harmonics, which can leak out.

Any of these possibilities of leakage may result in a signal of a harmonic, for example, the third harmonic, leaking into both, main receiver 414 and diversity receiver 412. The leakage may occur even if, at the antenna port, the harmonics are reduced by harmonic filters. The harmonics radiated by control, supply, and signal lines of power amplifier 418 may be picked up by the components of main receiver 414 or diversity receiver 412 in the following ways:

A. Signal lines of main receiver 414 or diversity receiver 412 receive the third harmonic.

B. Control and supply lines of an antenna switch can pick up the harmonic from the other control, supply, or signal lines for power amplifier 418.

C. Bond wires of the filters, antenna switches, or the transceiver chip can pick up the harmonic.

D. The ground currents will be picked up by the ground connections of the filters, antenna switches, or the transceiver.

All of the above ways will result in a harmonic that is generated inside power amplifier 418 leaking into main receiver 414 or diversity receiver 412, even if the output signal at the antenna port of antenna 408 is filtered perfectly by cascading many filters.

In addition to signal interferences 410 and 411 coming from power amplifier 418, there are other ways for signal interference exist. For example, from internal components 422, supply lines to the battery, lines on the display, connections to the charger, SIM card, camera, earpiece, microphone etc. All of these lines are similar to an antenna and are somewhere connected to semiconductors. Many semiconductors have a non-linear characteristic and therefore can work like a diode, which would use the fundamental of the TX signal to regenerate the harmonics. These harmonics are then radiated by the lines and picked up by antenna 406. Internal components 422 create signal interferences 424 and 426.

Figure 5:
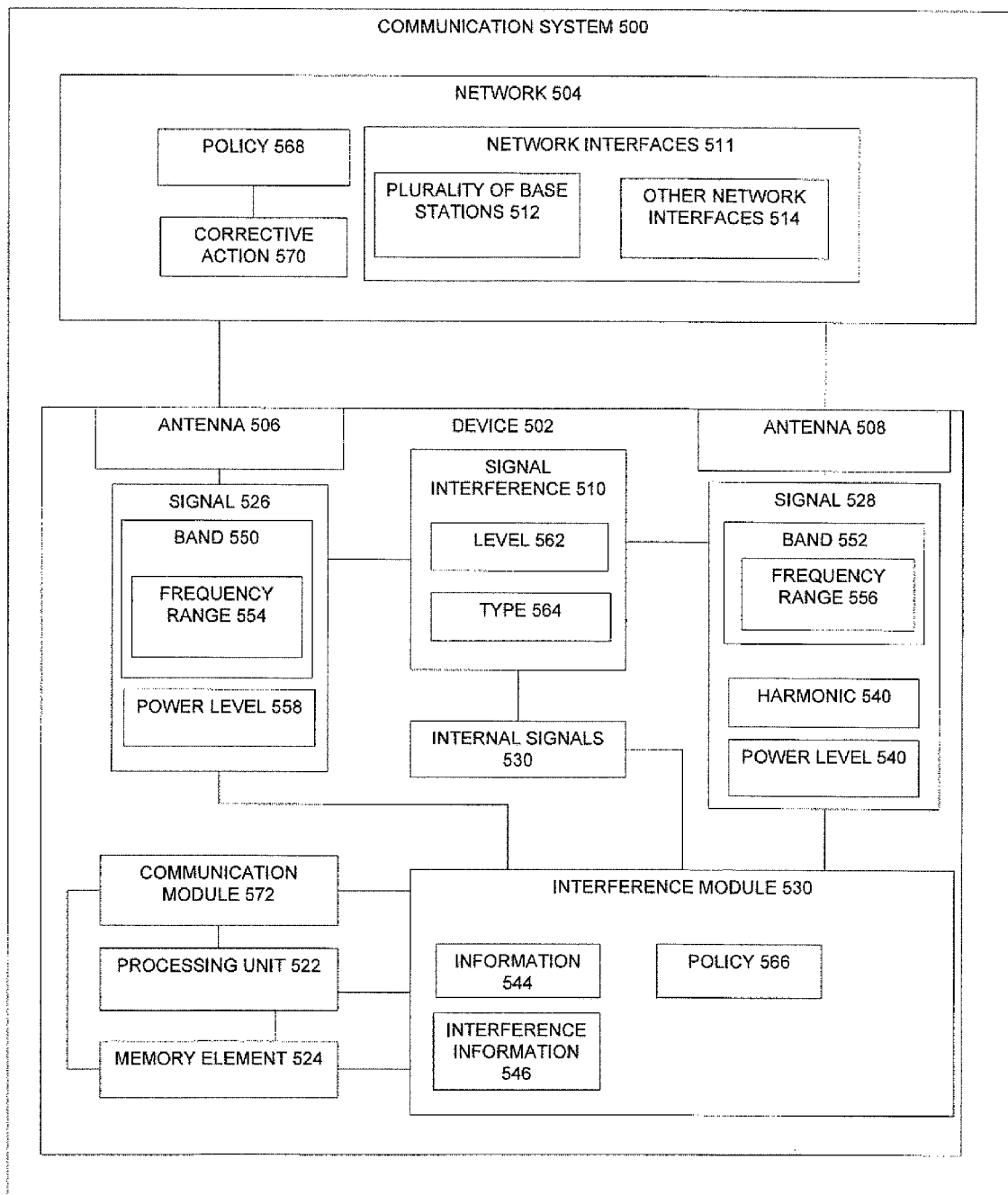
FIG. 5 shows a communication system in accordance with an illustrative embodiment.

FIG. 5 shows a communication system in accordance with an illustrative embodiment. Communication system 500 may be one example of communication system 100 as shown in FIG. 1.

In an embodiment, communication system 100 may include device 502 and network 504.

In different embodiments, device 502 may be any type of network interface capable of transmitting or receiving a wireless signal or radio signal. For example, device 502 may be a laptop, mobile phone, user equipment, smart phone, automobile, machine-to-machine (M2M) device, stationary devices (e.g. surveillance camera), or other suitable device.

Device 502 may include antenna 506, antenna 508, information module 520, communication module 572, processing unit 522, and memory element 524.

Antennas 506, 508 may be one example of antennas 306, 308 as shown in FIG. 3. Antennas 506, 508 may be configured to send and receive a plurality of signals, such as signals 526, 528, on different radio frequency technologies. For example, antennas 506, 508 may operate with WiFi, WiMax, 3G, 4G, white space, 802.11x, satellite, Bluetooth, near field communication, LTE, GSM/WCDMA/HSPA, CDMA1x/EVDO, DSRC, CAN, GPS, etc. In other embodiments, device 502 may have more or less antennas and the antennas may be configured to communicate with other wireless technologies. Signals 526, 528 may be received or transmitted signals. Signals 526, 528 may occur internally in device 502.

Device 502 may be associated with a plurality of signals. The plurality of signals may include signal 526, signal 526 and internal signals 530. When used herein, "associated with" means any signal produce from, received by, or interfere with a signal produced from or received by device 502. For example, a signal associated with device 502 may be a signal that travels or propagates through or from a component of device 502. In an embodiment, all signals associated with device 502 are internal to device 502. Also, for example, each one of signals 526, 528 may be a WiFi, WiMax, 3G, 4G, white space, 802.11x, satellite, Bluetooth, near field communication, LTE, GSM/WCDMA/HSPA, CDMA1x/EVDO, dedicated short range communications, GPS, or other suitable signal.

Additionally, internal signals 530 may be internal to device 502 and may be, for example, signals produced from supply lines to the battery, lines on the display, connections to the charger, SIM card, camera, earpiece, microphone, internal clocks, and other elements of device 502. Internal signals 530 may be part of the plurality of signals associated with device 502. All of these lines are similar to an antenna and they are somewhere connected to semiconductors. A semiconductor may have a non-linear characteristic and therefore can work like a diode, which would use the fundamental of the TX signal to regenerate harmonics. These harmonics are then radiated by the lines and picked up by the receive antennas. This type of signal may also be called passive intermodulation.

In an embodiment, signal interference 510 may be an interference of one signal by another signal. Signal interference 510 may be referred to as crosstalk, co-coupling, or cross coupling. For example, internal signals 530 may interfere with signal 526, signal 528 may interfere with signal 526, or some other combination of interference may occur.

Information 544 may be retrieved by information module 520 related to signals 526, 528, 530. Information 544 may be frequency bands 550, 552, frequency ranges 554, 556 for frequency bands 550, 552, TX/RX mode, whether carrier aggregation is used, session info, power levels 558, 560 of signals 526, 528, level 562 of signal interference 510, type 564 of signal interference 510, and other types of info related to each signal of signals 526, 528, 530.

One type 564 of signal interference 510 can be from harmonics, for example, harmonic 540. Harmonic 540 of a wave is a component frequency of the signal, such as signal 528, that is an integer multiple of the fundamental frequency. In other words, if the fundamental frequency is f, the harmonics have frequencies 2f, 3f, 4f, etc. For example, if the fundamental frequency is 50 Hz, then the third harmonic is 150 Hz. As shown in FIG. 3, harmonic 540, when band 552 is LTE band 17, may interfere with signal 526 when band 550 is LTE band 4.

In other embodiments, type 564 of signal interference may include internal signals 530 or harmonics of internal signals 530, such as, for example, internal clock harmonics. Also, type 564 may include frequencies that do not overlap but are near. For example, LTE band 40 may interfere with IEEE 802.11 WLAN since the edges of the frequency bands are within one hertz (Hz) of each other. In other embodiments, bands further than one frequency may still interfere with one another.

In an embodiment, each signal such as signal 526 includes a frequency band, such as band 550. Band 550 may be any size. For example, band 550 may be 20 MHz, or band 550 may be 1 Hz. The beginning and end frequency of each band define each bands frequency range. For example, frequency range 554 of band 550 may be 2110-2155 Mhz. This frequency range would correspond to LTE band 4 in the downlink. Other bands and other frequency ranges may be used.

Also, a power level exists for each signal 526, 528. For example, signal 526 has power level 558. Power level 558 may be, for example, between −80 to −120 dBm. The unit "dBm" is the power ratio in decibels (dB) of the measured power referenced to one milliwatt (mW). In other embodiments of this disclosure, power level 558 may be outside of −80 to −120 dBm or within another range. The level 562 of signal interference may also be represented by dBm. In another embodiment, for example, full TX power of a signal may be around 23 dBm with the RX signal at sensitivity limit around −100 dBm, such as in LTE 5 MHz.

In an embodiment, information module 530 is further configured to create interference information 546. Information module 530 may create interference information 546 from information 544. Information module 530 may be connected to processing unit 522 and memory element 524. In another embodiment, information module 530 may include its own processing unit and memory element.

Communication module 572 may be configured to send interference information 546 to network 504. Communication module 572 may be connected to processing unit 522 and memory element 524. In another embodiment, communication module 572 may include its own processing unit and memory element.

Interference information may include an occurrence of signal interference 510, which may be identified by a bit; level 562; type 564; any other information included in information 544; a value indicating a minimum frequency shift that is required to reduce signal interference 510; other suitable information; or any combination thereof.

Information module 530 may consult policy 566 to determine what information 544 to include in interference information 546. Policy 566 may be set by a user, a service provider, manufacturer, or dynamically by device 502 or network 504. Policy 566 may include what information to send to network 504 in the case of signal interference 510.

In an embodiment, network 504 includes plurality of base stations 512, other network interfaces 514, policy 568, and corrective action 570.

Plurality of base stations 512 may be an example of base stations 104, 106 as shown in FIG. 1. Plurality of base stations 512 may communicate with device 502 over a network, such as LTE.

Other network interfaces 514 may be an example of wireless network interface 108 as shown in FIG. 1. Other network interfaces 514 may communicate with device 502 over a network, such as IEEE 801.11.

In an embodiment, corrective action 570 may be an action taken by network 504 to resolve or reduce signal interference 510. Network 504 may consult policy 568 to identify the optimum corrective action based on interference information 546.

Corrective action 570 may include handing over a connection of device 502 from one base station to another base station, adjusting frequency range 556 from a low band to a high band, adjusting frequency range 556 to new frequency range, switching off carrier aggregation and only using the uplink and downlink on one band, aligning resource blocks of signal 528, sending a message to device 502 to reduce power level 540 of signal 528, switching to a modulation scheme that requires less signal to noise ration or error vector magnitude.

Signal-to-noise ratio (SNR) may compare the level of a desired signal to the level of background noise. It may also be defined as the ratio of signal power to the noise power. Also, error vector magnitude (EVM) may be a measure used to quantify the performance of a digital radio transmitter or receiver.

In another embodiment, corrective action may also include increasing power level 558 of signal 526 or sending a message to device 502 to reduce power level 540 of signal 528 based on level 562 of signal interference 510.

Additionally, in an embodiment, when device 502 sends interference information 546 to network 504, interference information 546 may also indicate corrective action 570.

In an embodiment, device 502 may include one or more memory elements 524 for storing information to be used in achieving operations associated with applications management, as outlined herein. For example, a policy may be stored in memory element 524 for optimizing signal interference management in communication system 500.

These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information in communication system 500 could be provided in any database, register, table, cache, queue, control list, or storage structure, based on particular needs and implementations, all of which could be referenced in any suitable timeframe. Any of the memory or storage items discussed herein should be construed as being encompassed within the broad term 'memory element' as used herein in this disclosure.

In example embodiments, the operations for managing signal interference outlined herein may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar machine, etc.). In some of these instances, one or more memory elements 524 can store data used for the operations described herein. This includes the memory elements being able to store software, logic, code, or processor instructions that are executed to carry out the activities described in this disclosure.

Additionally, processing unit 522 may execute any type of instructions associated with the data to achieve the operations detailed herein in this disclosure. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Processing unit 522 may be a number of processors, a multi-processor core, a shared processor, or some other type of processor, depending on the particular implementation. A number, as used herein with reference to an item, means one or more items. Further, processing unit 522 may be implemented using a number of heterogeneous processor systems in which a main processor is present with secondary processors on a single chip. As another illustrative example, processing unit 522 may be a symmetric multi-processor system containing multiple processors of the same type.

The illustration of communication system 500 in FIG. 5 is not meant to imply physical or architectural limitations to the manner in which an aspect of this disclosure may be implemented. Other components in addition and/or in place of the ones illustrated may be used. Some components may be unnecessary in an aspect of this disclosure. For example, processing unit 522 may be located within information module 530. Also, for example, more antennas than antennas 506, 508 may exist.

Figure 6:
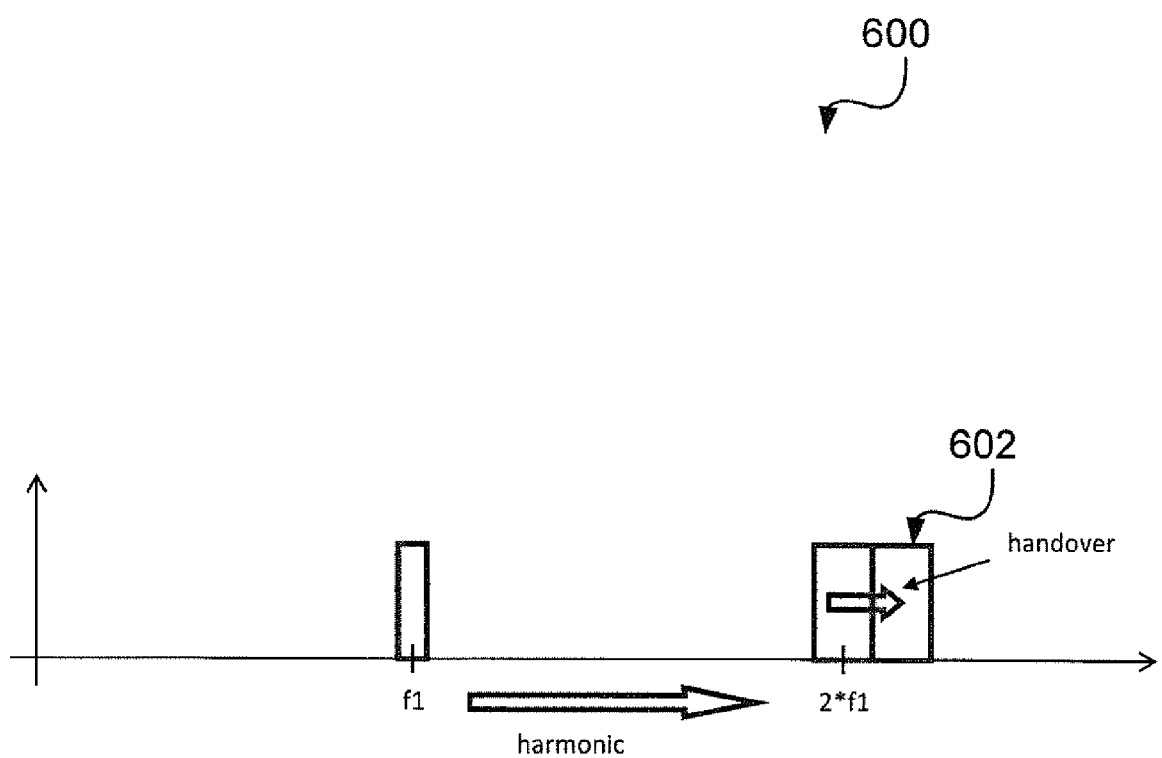
FIG. 6 shows a corrective action in accordance with an illustrative embodiment.

FIG. 6 shows a corrective action in accordance with an illustrative embodiment. Corrective action 600 may be one example of corrective action 570 as shown in FIG. 5.

In an embodiment, corrective action 600 includes handover frequency 602, frequency f1, and harmonic 2*f1. Corrective action 600 may be one type of corrective action taken by a network, such as network 504 as shown in FIG. 5.

Frequency f1 may be a frequency transmitted by a device. Harmonic 2*f1 may be the second harmonic of frequency f1. Harmonic 2*f1 may be interfering with a received signal. In this case, a network may perform a handover to another cell. A handover may be a change in connection from one cell of a base station to another cell of the same or another base station.

The handover puts at least one of the transmitted or received signal into handover frequency 502 which is not interfered by harmonic 2*f1.

Figure 7:
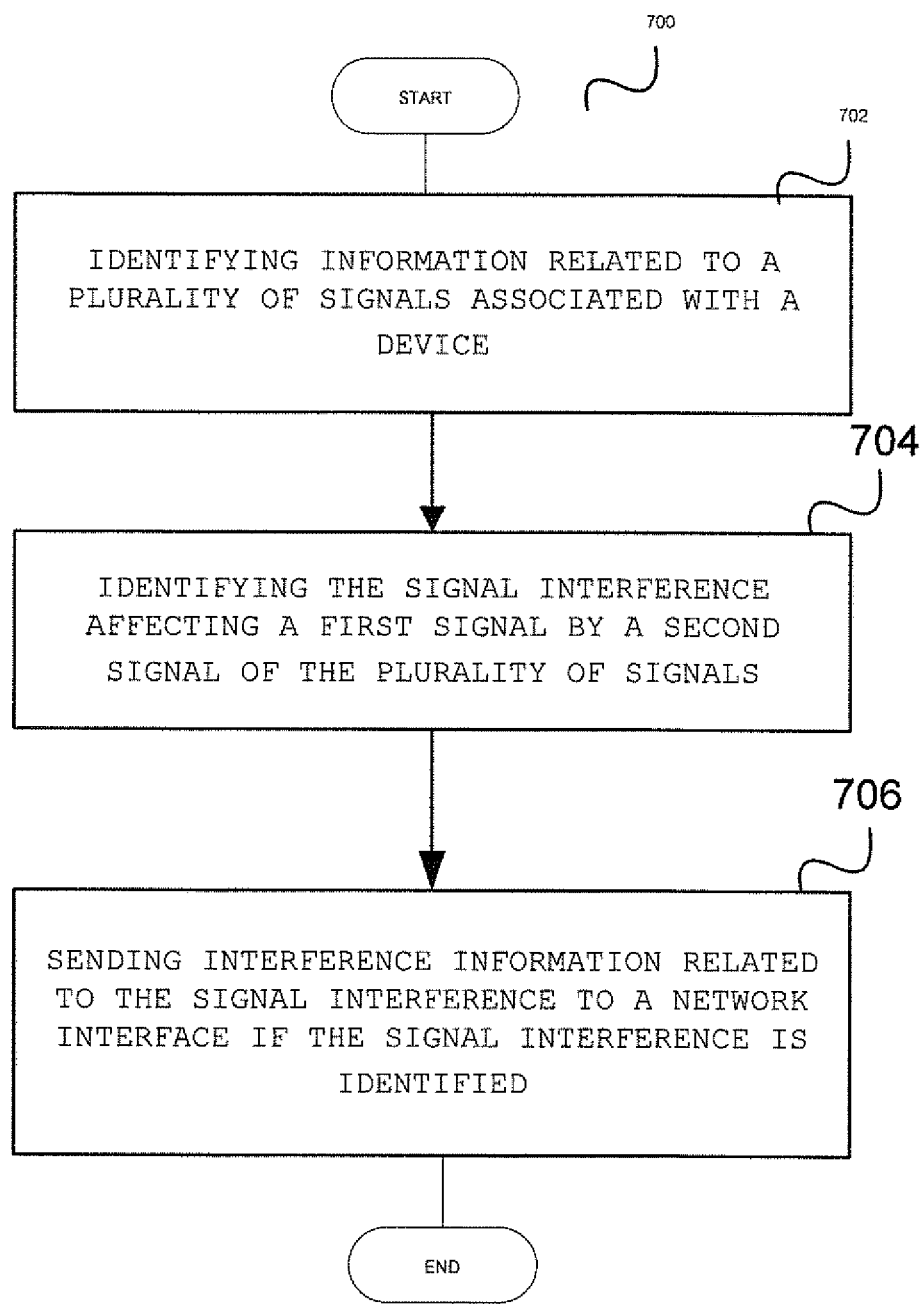
FIG. 7 is a flowchart for managing signal interference in accordance with an aspect of this disclosure.

FIG. 7 is a flowchart for managing signal interference in accordance with an aspect of this disclosure. Process 700 may be implemented in, for example, device 502 from FIG. 5. In other embodiments, process 700 may be implemented in other devices in this disclosure.

Process 700 begins with an information module identifying information related to a plurality of signals associated with a device (step 702). The information module may identify information, such as information 544 as shown in FIG. 5. The information may include the frequency ranges of the signals, bands of the signals, as well as other information.

Next, the information module identifies the signal interference affecting a first signal by a second signal of the plurality of signals (step 704). If the signal interference is not identified, the process terminates.

The information module may identify whether any of the frequency ranges of the different signals overlap. If the ranges overlap then there may be signal interference. There may also be signal interference even if the frequency ranges are close to one another, such as adjacent frequency bands.

Then, a transceiver sends interference information related to the signal interference to a network interface if the signal interference is identified (step 706). Thereafter, the process terminates.

The interference information may include parts or all of the information obtained in step 702. Additionally, the interference information may include other information, such as the occurrence of signal interference. Also, the interference information may include a corrective action for the network or network interface to perform.

In the case of signal interference inside the device like TX harmonics falling into the RX signal, this is signaled to the base station, so that the base station can change the situation to prevent this signal interference by doing handovers, frequency changes, power changes or similar corrective actions.

In one embodiment, a bit would be sent to the base station indicating that the device detected that there is a signal interference condition. The base station can then change the setup, for example switch off carrier aggregation or it can change the resource block allocation.

Figure 8:
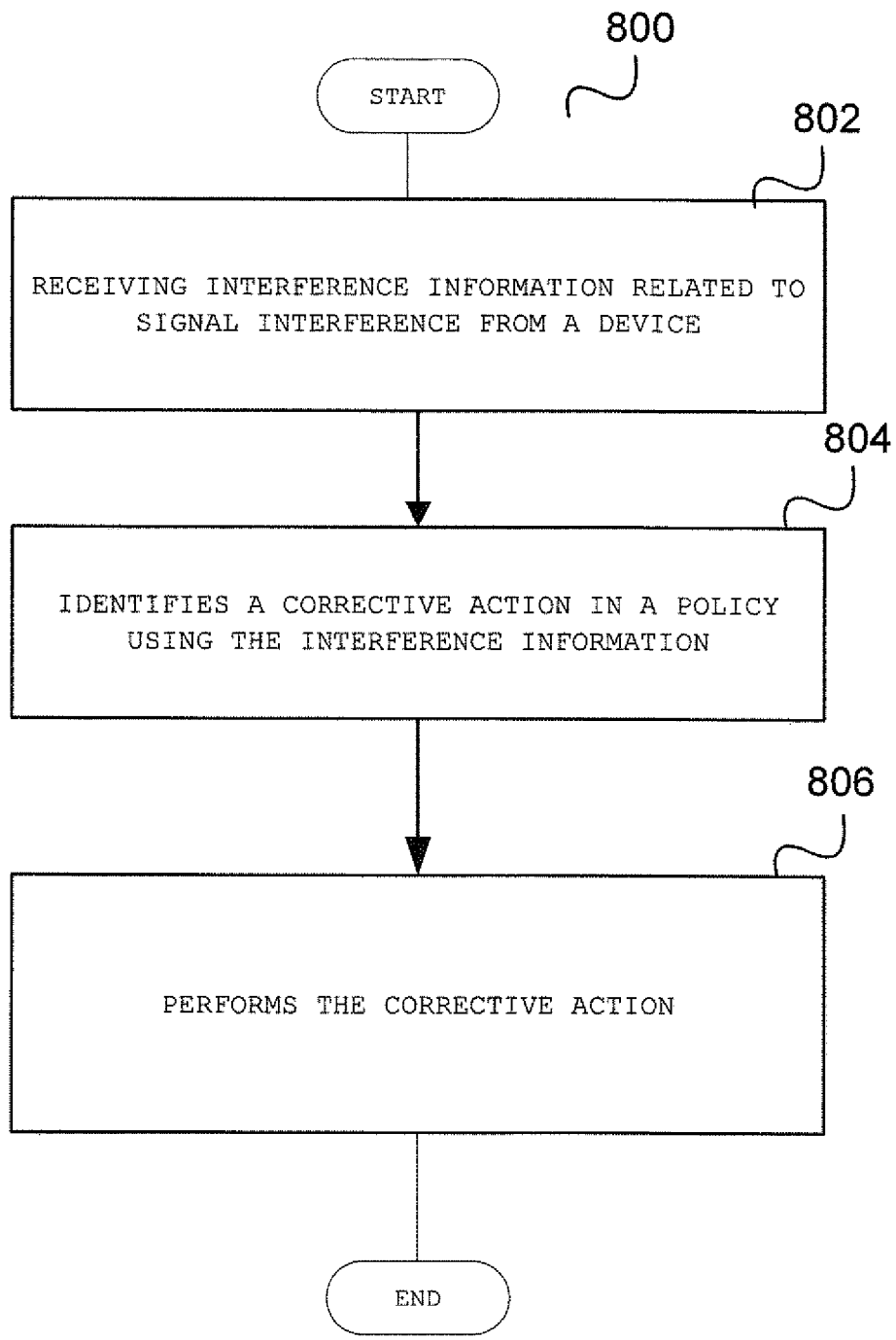
FIG. 8 is a flowchart for managing signal interference in accordance with an aspect of this disclosure.

FIG. 8 is a flowchart for managing signal interference in accordance with an aspect of this disclosure. Process 800 may be implemented in, for example, network 504 from FIG. 5. In other embodiments, process 800 may be implemented in other networks in this disclosure.

Process 800 begins with receiving interference information related to signal interference from a device (step 802).

The network then identifies a corrective action in a policy using the interference information (step 804).

Next, the network performs the corrective action (step 806). The corrective action may be to reduce the signal interference. Thereafter, the process terminates. The corrective action may be taken by adjustments only within the network. In an embodiment, the corrective action includes sending a message to the device. The message may include what corrective was taken by the network. The message may also include corrective actions for the device to take.

Figure 9:
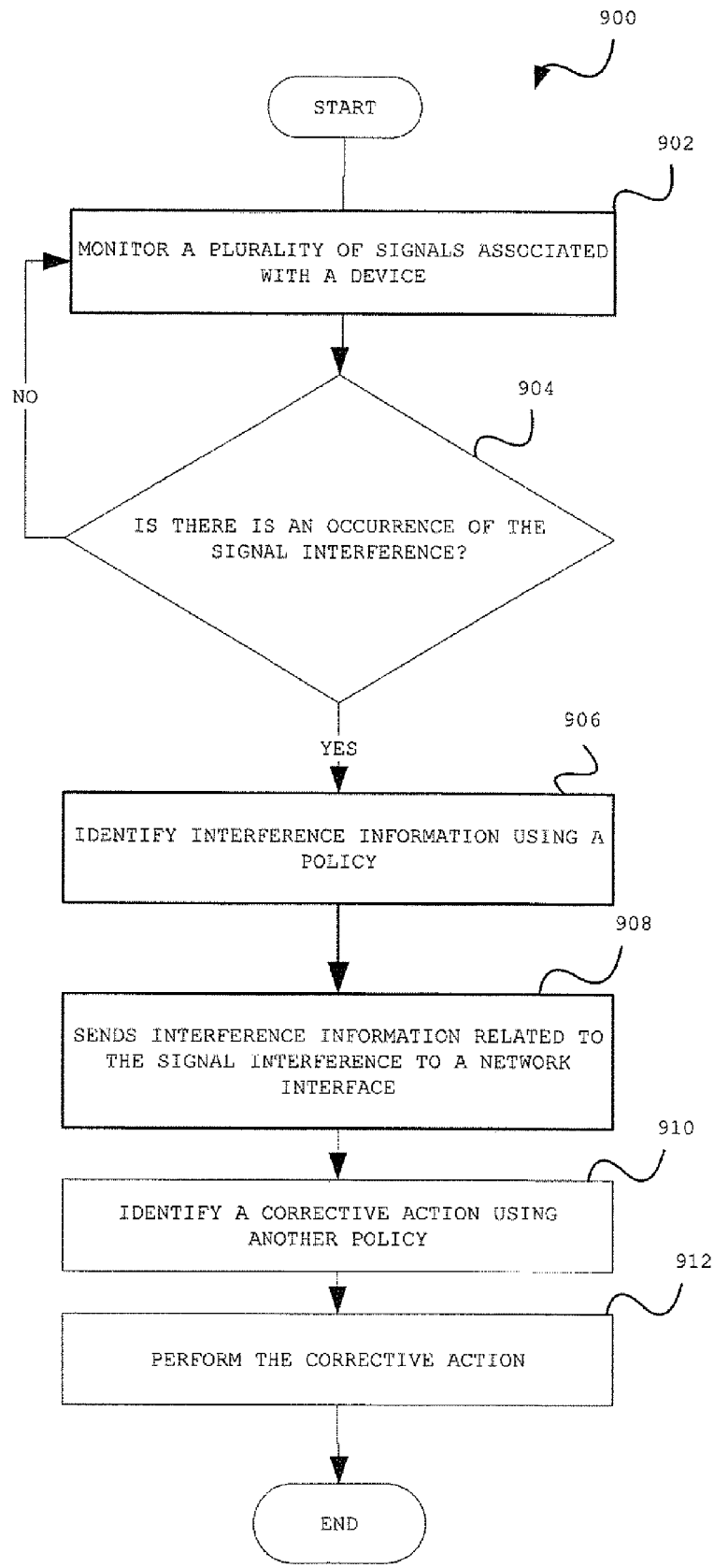
FIG. 9 is a flowchart for managing signal interference in accordance with an aspect of this disclosure.

FIG. 9 is a flowchart for managing signal interference in accordance with an aspect of this disclosure. Process 900 may be implemented in, for example, device 502 and network 504 from FIG. 5. In other embodiments, process 900 may be implemented in other networks and devices in this disclosure.

Process 900 begins with monitoring a plurality of signals associated with a device (step 902). The frequencies may be monitored. In an embodiment, other information may be monitored as well, such as, for example, technologies used to transmit and receive any signals.

Next, the process determines whether there is an occurrence of the signal interference (step 904). There may be an occurrence if any frequencies of the frequencies of the signals overlap, if they are adjacent to one another, or if a harmonic of a signal overlaps with a frequency of another signal.

Responsive to an absence of the occurrence, the process moves to step 902 and continues to monitor the plurality of signals. Responsive to the occurrence, the process identifies interference information using a policy (step 906). The policy may indicate what information is to be sent to a network interface of a network. The policy may indicate to send all information that is monitored or just the occurrence of signal interference. In an embodiment, the policy may indicate to send another combination of information.

Next, the process sends interference information related to the signal interference to a network interface (step 908). The process then identifies a corrective action using another policy (step 910). Then, the process preforms the corrective action (step 912). Thereafter, the process terminates.

In different embodiments, there are different corrective actions the base station may implement. For example, the base station may handover the device to another cell or base station that does not have harmonic issues, change the uplink frequency from the low band to the high band so that the harmonic is not generated on the receive frequency, handover of the TX to another frequency, switch off carrier aggregation and only use the TX and RX on one band. Also, if only a few resource blocks of a LTE system are used, the position of the TX resource blocks can be aligned so that their harmonics do not interfere with the resource blocks used in the receiver. Additionally, the transmit power can be reduced or the modulations scheme may be switched on the aggregated carrier that requires less SNR/EVM.

In an embodiment, in addition to a value of the signal power level, other information that may be sent with the interference information could be:

A. A bit indicating that the signal interference is internal interference in the device. Then, the base station may check what kind of internal interference could exist and take appropriate corrective action.

B. A value indicating the level of the internal signal interference. The base station could use the value to determine if it is possible to solve the problem by reducing the output power of the base station.

C. A value indicating a frequency shift that is the minimum required to be clear of harmonics.

D. Any other information that can help the base station to determine how the signal interference can be reduced.

The flowcharts and block diagrams in the different depicted aspects illustrate the architecture, functionality, and operation of some possible implementations of apparatus, methods, system, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

In an embodiment, a method is provided for managing signal interference. The method comprises identifying information related to a plurality of signals associated with a device; identifying the signal interference affecting a first signal by a second signal of the plurality of signals based on the information; and sending interference information related to the signal interference to a network interface if the signal interference is identified.

In an embodiment, the interference information indicates an occurrence of the signal interference.

In an embodiment, the method further comprises receiving the interference information and responsive to receiving the interference information, performing a corrective action to reduce the signal interference.

In an embodiment, the first signal has a first frequency range and the second signal has a second frequency range.

In an embodiment, a harmonic of the second frequency range overlaps with the first frequency range.

In an embodiment, a harmonic of the second frequency range is near the first frequency range.

In an embodiment, the first signal and the second signal occur internally in the device.

In an embodiment, one of the first signal and the second signal is transmitted over a cellular network and the other signal is transmitted over a wireless local area network.

In an embodiment, the first frequency range is a first Long Term Evolution Band and wherein the second frequency is a second Long Term Evolution Band.

In an embodiment, the method further comprises handing over a connection of the device from a cell to another cell.

In an embodiment, wherein the second frequency is in a low band, the method further comprises adjusting, by the base station, the second frequency from the low band to a high band.

In an embodiment, the method further comprises: adjusting the second frequency to a third frequency.

In an embodiment, wherein the device is using carrier aggregation, the method further comprises switching off carrier aggregation and only use the uplink and downlink on one band.

In an embodiment, the method further comprises aligning resource blocks of the first or second signal, wherein harmonics of the second signal do not interfere with resource blocks of the first signal.

In an embodiment, the method further comprises sending a message to the device to reduce the power of the second signal.

In an embodiment, the method further comprises switching to a modulation scheme that requires less signal to noise ratio or error vector magnitude.

In an embodiment, the interference information indicates a level of the signal interference.

In an embodiment, the corrective action is at least one of increasing a power level of the first signal and sending a second interference information to the device to reduce a power level of the second signal based on a level of the signal interference.

In an embodiment, the interference information comprises a value indicating a minimum frequency shift that is required to reduce the signal interference.

In an embodiment, the interference information indicates a type of signal interference.

In an embodiment, the interference information indicates the corrective action.

In an embodiment, the second signal is internal clock harmonics.

In an embodiment, a device is provided. The device comprising a processing unit; an information module connected to the processing unit and configured to identify information related to a plurality of signals associated with the device and identify a signal interference affecting a first signal by a second signal of the plurality of signals based on the information; and a communication module connected to the processing unit and configured to send interference information to a network interface related to the signal interference if the signal interference is identified.

In an embodiment, the interference information indicates an occurrence of the signal interference.

In an embodiment, the device further comprises the network interface configured to receive the interference information and perform a corrective action to reduce the signal interference in response to receiving the interference information.

In an embodiment, the first signal has a first frequency range and the second signal has a second frequency range.

In an embodiment, a harmonic of the second frequency range overlaps with the first frequency range.

In an embodiment, a system is provided for managing signal interference. The system comprises a device for identifying information related to a plurality of signals associated with the device and identifying the signal interference affecting a first signal by a second signal of the plurality of signals based on the information; and a network interface for performing a corrective action to reduce the signal interference.

In an embodiment, the device comprises a communication module for sending interference information to a network interface related to the signal interference if the signal interference is identified.

In an embodiment, the interference information indicates an occurrence of the signal interference.

In an embodiment, a method is provided for managing signal interference. The method comprises receiving interference information related to the signal interference from a device; identifying a corrective action using the interference information; and performing the corrective action.

In an embodiment, identifying the corrective action using the interference information comprises identifying the corrective action in a policy using the interference information.

In an embodiment, performing the corrective action comprises performing the corrective action to reduce the signal interference.

In an embodiment, the signal interference is between a first signal and a second signal, and wherein the first and second signal are associated with the device.

In an embodiment, performing the corrective action comprises handing over a connection of the device from a cell to another cell.

In an embodiment, performing the corrective action comprises at least one of increasing a power level of the first signal and sending a message to the device to reduce a power level of the second signal based on a level of the signal interference.

In an embodiment, performing the corrective action comprises switching to a modulation scheme that requires less signal to noise ratio or error vector magnitude.

In an embodiment, performing the corrective action comprises sending a message to the device to reduce the power of the second signal.

In an embodiment, performing the corrective action comprises aligning resource blocks of the first or second signal, wherein harmonics of the second signal do not interfere with resource blocks of the first signal.

In an embodiment, the device is using carrier aggregation, wherein performing the corrective action comprises switching off carrier aggregation and only use the uplink and downlink on one band.

In an embodiment, the first signal has a first frequency range and the second signal has a second frequency range, wherein performing the corrective action comprises adjusting the second frequency to a third frequency.

In an embodiment, the first signal has a first frequency range and the second signal has a second frequency range, wherein performing the corrective action comprises, wherein the second frequency is in a low band or high band, further comprising adjusting the second frequency from to the low band if in the high band or to the high band if in the low band.

In an embodiment, the interference information indicates the corrective action.

In an embodiment, a network is provided. The network comprises a network interface configured to receive interference information related to signal interference from a device, identify a corrective action using the interference information, and perform the corrective action.

In an embodiment, the network interface is further configured to identify the corrective action in a policy using the interference information.

In an embodiment, the network interface is further configured to perform the corrective action to reduce the signal interference.

In an embodiment, the signal interference is between a first signal and a second signal, and wherein the first signal and second signal are associated with the device.

The invention claimed is:

1. A method for managing signal interference in a wireless communication device comprising a first receiver the method comprising:
   determining an occurrence of signal interference within the wireless communication device;
   determining one or more types of interference information to send to a network based on a predetermined policy;
   sending interference information related to the signal interference associated with the wireless communication device to a network interface of the network based on the predetermined policy to reduce the signal interference; and
   performing one or more corrective actions to decrease the signal interference within the wireless communication device; wherein the network performs the one or more corrective actions; wherein the one or more corrective actions include a handover of the wireless communication device from one base station to another base station, adjusting a frequency range from a low band to a high band, adjusting a frequency range to a new frequency range, aligning resource blocks of a signal, sending a message to the wireless communication device to reduce a power level thereof, switching to a modulation scheme that requires less of a signal-to-noise ratio or error vector magnitude, and combinations thereof.

2. The method of claim 1, wherein the wireless communication device further comprises a second receiver operating in carrier aggregation mode, wherein signals received at the first receiver are first signals and signals received at the second receiver are second signals.

3. The method of claim 2, wherein the signals have a first frequency range and a second frequency range.

4. The method of claim 3, wherein a harmonic of the second frequency range overlaps with the first frequency range.

5. The method of claim 3, wherein a harmonic of the second frequency range is near the first frequency range.

6. The method of claim 3, wherein the signals occur internally in the wireless communication device.

7. The method of claim 3, wherein one of the signals is transmitted over a cellular network and another one of the signals are transmitted over a wireless local area network.

8. The method of claim 3, wherein the first frequency range is a first Long Term Evolution Band and wherein the second frequency is a second Long Term Evolution Band.

9. The method of claim 2, wherein the signal interference associated with the wireless device is generated by a power amplifier coupled to a transmitter of either the first receiver or the second receiver, and wherein the signal interference affects reception of signals received by the first receiver and the second receiver.

10. The method of claim 1, wherein the interference information indicates a level of the signal interference.

11. The method of claim 1, wherein the interference information comprises a value indicating a minimum frequency shift that is required to reduce the signal interference.

12. The method of claim 1, wherein the interference information indicates a type of signal interference.

13. The method of claim 1, wherein the clock interference is internal clock harmonics.

14. The method of claim 1, further comprising switching off the carrier aggregation mode as a corrective action performed by the network.

15. A device comprising:
   a processing unit;
   an information component operatively coupled to the processing unit to identify information related to a plurality of signals associated with the device and to determine an occurrence of a signal interference associated with the device; wherein the signal interference is generated by a power amplifier coupled to a transmitter of a first receiver; wherein the information component is configured to determine one or more types of interference information to send to the network based on the predetermined policy;
   a communication component is further configured to send interference information to a network interface of a network based on the policy to reduce the signal interference; and
   wherein the device is configured to have one or more corrective actions performed thereon to decrease the signal interference within the device; and wherein the network performs the one or more corrective actions; wherein the one or more corrective actions include a handover of the wireless communication device from one base station to another base station, adjusting a frequency range from a low band to a high band, adjusting a frequency range to a new frequency range, aligning resource blocks of a signal, sending a message to the device to reduce a power level thereof, switching to a modulation scheme that requires less of a signal-to-noise ratio or error vector magnitude, and combinations thereof.

16. The device of claim 15, wherein the signals have a first frequency range and a second frequency range.

17. The device of claim 16, wherein a harmonic of the second frequency range overlaps with the first frequency range.

* * * * *